US012752963B2

(12) United States Patent
Song et al.

(10) Patent No.: US 12,752,963 B2
(45) Date of Patent: Oct. 6, 2026

(54) EXCREMENT COLLECTION APPARATUS AND NURSING MACHINE

(71) Applicant: Chinalco Materials Application Research Institution Co., Ltd., Beijing (CN)

(72) Inventors: Xiaoyu Song, Beijing (CN); Guojun Wang, Beijing (CN); Qingyong Liu, Beijing (CN); Xiaodong Mao, Beijing (CN); Junqiang Wang, Beijing (CN); Xueguang Dong, Beijing (CN); Mingdong Huang, Beijing (CN); Yingdong Li, Beijing (CN); Zhiqiang Xu, Beijing (CN); Jingwei Zhao, Beijing (CN); Zhikai Zheng, Beijing (CN); Huixue Jiang, Beijing (CN); Ronghui Fan, Beijing (CN); Jingquan Li, Beijing (CN); Xiandong Liu, Beijing (CN)

(73) Assignee: CHINALCO MATERIALS APPLICATION RESEARCH INSTITUTION CO., LTD., Beijing (CN)

( * ) Notice: Subject to any disclaimer, the term of this patent is extended or adjusted under 35 U.S.C. 154(b) by 202 days.

(21) Appl. No.: 18/940,160

(22) Filed: Nov. 7, 2024

(65) Prior Publication Data

US 2025/0263196 A1 Aug. 21, 2025

(30) Foreign Application Priority Data

Feb. 19, 2024 (CN) ......................... 202410183821.7

(51) Int. Cl.

| | |
|---|---|
| ***B65D 6/26*** | (2006.01) |
| ***B60R 16/033*** | (2006.01) |
| ***B65D 61/00*** | (2006.01) |

(52) U.S. Cl.
CPC .............. *B65D 7/32* (2013.01); *B60R 16/033* (2013.01); *B65D 61/00* (2013.01)

(58) Field of Classification Search
CPC .......... B65D 7/32; B65D 61/00; B60R 16/033
See application file for complete search history.

(56) References Cited

U.S. PATENT DOCUMENTS 11,848,460 B2 * 12/2023 Murai ...................... B60K 1/04
12,083,877 B2 * 9/2024 Danneberg ............ B62D 25/20
(Continued)

FOREIGN PATENT DOCUMENTS

CN 215578900 A 1/2022
CN 217374126 U 9/2022
(Continued)

OTHER PUBLICATIONS

The first search report of CN application No. 202410183821.7 issue on Mar. 20, 2024.
(Continued)

*Primary Examiner* — Jacob B Meyer
(74) *Attorney, Agent, or Firm* — Scully, Scott, Murphy & Presser, P.C.

(57) ABSTRACT

The disclosure provides a battery pack frame, a frame set, and a new energy heavy truck. The battery pack frame includes a frame body formed by connecting a plurality of frame beams end to end. The battery pack frame includes a plurality of adapter assemblies for pre-mounting two adjacent frame beams. At least one adapter assembly is arranged between any the two adjacent frame beams, and each adapter assembly includes a threaded connection assembly and an inserting limiting assembly, the inserting limiting assembly being configured to limit relative positions of the two adjacent frame beams, the threaded connection assembly being configured to pre-connect the two adjacent frame
(Continued)

beams, and the two adjacent frame beams being pre-mounted through the each adapter assembly and then welded. By using the solution, the tangential force that the two adjacent frame beams may withstand after being connected is improved.

20 Claims, 5 Drawing Sheets

(56) References Cited

U.S. PATENT DOCUMENTS

| | | | | |
|---|---|---|---|---|
| 12,103,376 | B2* | 10/2024 | Satou | B60K 1/04 |
| 12,403,757 | B2* | 9/2025 | Kumagai | B62D 21/02 |
| 2018/0108891 | A1* | 4/2018 | Fees | B60L 50/66 |
| 2018/0361874 | A1* | 12/2018 | Kobayashi | H01M 50/227 |
| 2018/0370570 | A1* | 12/2018 | Ayukawa | B62D 25/2018 |
| 2022/0297523 | A1* | 9/2022 | Danneberg | B62D 25/20 |
| 2022/0320659 | A1* | 10/2022 | Munjurulimana | B62D 25/2036 |
| 2022/0388385 | A1* | 12/2022 | Okonogi | H01M 50/249 |
| 2023/0311631 | A1* | 10/2023 | Boeck | B60K 1/04 180/68.5 |
| 2024/0396276 | A1* | 11/2024 | Raybold | B60R 16/033 |
| 2025/0149699 | A1* | 5/2025 | Qi | H01M 10/6554 |
| 2025/0263196 | A1* | 8/2025 | Song | B65D 7/32 |

FOREIGN PATENT DOCUMENTS

| | | | |
|---|---|---|---|
| CN | 217444536 | U | 9/2022 |
| CN | 218070031 | U | 12/2022 |
| CN | 218919124 | U | 4/2023 |
| CN | 116544577 | A | 8/2023 |
| CN | 220122028 | U | 12/2023 |
| CN | 220358199 | U | 1/2024 |
| CN | 220492111 | U | 2/2024 |
| WO | 2023020175 | A1 | 2/2023 |

OTHER PUBLICATIONS

The supplementary search report of CN application No. 202410183821.7 issue on Apr. 8, 2024.

* cited by examiner

EXCREMENT COLLECTION APPARATUS AND NURSING MACHINE

CROSS-REFERENCE TO RELATED APPLICATION

This disclosure claims priority to Chinese Patent Application No. 202410183821.7 filed to the China National Intellectual Property Administration on Feb. 19, 2024 and entitled "Battery Pack Frame, Frame Set, and New Energy Heavy Truck".

TECHNICAL FIELD

The disclosure relates to the technical field of new energy heavy trucks, and in particular to a battery pack frame, a frame set, and a new energy heavy truck.

BACKGROUND

In recent years, rear-mounted battery-swapping trucks have been widely favored by the market due to their advantages of speed, convenience, and high energy utilization. A battery pack frame is usually placed at the back of a cab and is welded by a plurality of frame beams connected end to end. However, during the mounting and forming process of the battery pack frame, it is easy to encounter the situation of difficulty in aligning a welding position at a corner connection position, resulting in unstable weld formation and low tangential force that may be withstood, making it difficult to ensure the structural strength of the battery pack frame, as well as the reliability and stability of application.

SUMMARY

Some embodiments of the disclosure provide a battery pack frame, a frame set, and a new energy heavy truck, so as to solve the problems in the related art of unstable weld formation at a corner welding position of the battery pack frame and low tangential force that may be withstood.

In order to solve the above problems, according to one embodiment of the disclosure, the disclosure provides a battery pack frame. The battery pack frame includes a frame body formed by connecting a plurality of frame beams end to end. The battery pack frame includes a plurality of adapter assemblies for pre-mounting two adjacent frame beams of the plurality of frame beams. At least one adapter assembly of the plurality of adapter assemblies is arranged between any the two adjacent frame beams, and each adapter assembly of the plurality of adapter assemblies includes a threaded connection assembly and an inserting limiting assembly, the inserting limiting assembly being configured to limit relative positions of the two adjacent frame beams, the threaded connection assembly being configured to pre-connect the two adjacent frame beams, and the two adjacent frame beams being pre-mounted through the each adapter assembly and then welded.

In an embodiment mode, the each frame beam of the plurality of frame beams is a hollow beam body with a rectangular cross section, the at least one adapter assembly is arranged in a cavity of the each frame beam in a penetrating manner and is located at an end of the each frame beam, a weld between the two adjacent frame beams is a rectangular annular weld, and the rectangular annular weld is arranged around the at least one adapter assembly.

In an embodiment mode, a surface where an end opening of the each frame beam is located is inclined relative to a surface perpendicular to an extension direction of the each frame beam. The inserting limiting assembly includes an inserting protrusion arranged in the cavity of the each frame beam. An end of the inserting protrusion protrudes from the end opening but does not protrudes from the each frame beam. An inserting groove is formed in an end opening of another frame beam of the two adjacent frame beams. The two adjacent frame beams are matched with the inserting groove by means of the inserting protrusion in an inserted manner.

In an embodiment mode, a reinforced beam set is arranged in the cavity of the each frame beam, a part, protruding from the end opening, of the reinforced beam set forms the inserting protrusion, and the inserting groove is arranged at one end of the reinforced beam set which does not protrude from the end opening.

In an embodiment mode, a plurality of threaded connection assemblies are provided, the plurality of threaded connection assemblies are distributed at intervals in an extension direction of the rectangular annular weld of the each frame beam, and the threaded connection assembly includes a connecting lug and an adapter bolt, the connecting lug including a first lug plate and a second lug plate connected to each other, and the first lug plate and the second lug plate being respectively in threaded connection with the two adjacent frame beams through adapter bolts of the plurality of threaded connection assemblies.

In an embodiment mode, the each frame beam includes two oppositely arranged side beams. An auxiliary support beam is integrally arranged at a bottom of each of the side beams, and two auxiliary support beams at bottoms of the two oppositely arranged side beams are oppositely arranged. The frame body further includes a main support beam arranged between the two auxiliary support beams and connected to the two auxiliary support beams. The main support beam and the two auxiliary support beams are configured to jointly support the battery pack body, liquid-cooled channels are distributed on the main support beam and the auxiliary support beam, and the liquid-cooled channels are configured to cool the battery pack body.

In an embodiment mode, the main support beam includes a first liquid-cooled beam and a reinforced beam stacked up and down and arranged integrally. The auxiliary support beam includes a fixed beam and a second liquid-cooled beam integrally arranged above the fixed beam. At least one liquid-cooled channel of the liquid-cooled channels is formed in cavities of the first liquid-cooled beam and the second liquid-cooled beam, the reinforced beam is spaced from fixed beams on both sides of the reinforced beam, and the first liquid-cooled beam and second liquid-cooled beams on both sides of the first liquid-cooled beam are subjected to double-sided friction stir welding.

According to another embodiment of the disclosure, a frame set is provided. The frame set includes a connecting assembly and a plurality of above battery pack frames. The plurality of battery pack frames are sequentially stacked in a height direction of the frame set, any two adjacent battery pack frames of the plurality of battery pack frames are connected through the connecting assembly, and a battery pack body is correspondingly arranged in any one of the plurality of battery pack frames.

In an embodiment mode, the connecting assembly includes a plurality of bolt assemblies. Two corresponding frame beams of the any two adjacent battery pack frames are connected through one bolt assembly of the plurality of bolt assemblies. Each of the bolt assemblies includes a nut assembly and a connecting bolt. The nut assembly includes a lining beam and a plurality of connecting nuts welded to the lining beam. The nut assembly is arranged in one frame beam of one of the plurality of battery pack frames. One end of the connecting bolt penetrates into an adjacent frame beam from an inside of another frame beam and is in threaded connection with corresponding connecting nut of the plurality of connecting nuts.

In an embodiment mode, the each frame beam of the battery pack frame is provided with a weight-saving mounting groove, and the connecting bolt is mounted into a cavity of the each frame beam from the weight-saving mounting groove.

According to still another embodiment of the disclosure, a new energy heavy truck is provided. The new energy heavy truck includes a plurality of battery pack bodies and the above frame set. The plurality of battery pack bodies are correspondingly arranged in the plurality of battery pack frames of the frame set.

By applying the technical solution of the disclosure, the battery pack frame is provided. The battery pack frame includes the frame body formed by connecting the plurality of frame beams end to end. The battery pack frame includes the plurality of adapter assemblies for pre-mounting the two adjacent frame beams. At least one adapter assembly is arranged between any two adjacent frame beams, and the adapter assembly includes the threaded connection assembly and the inserting limiting assembly, the inserting limiting assembly being configured to limit the relative positions of the two adjacent frame beams, the threaded connection assembly being configured to pre-connect the two adjacent frame beams, and the two adjacent frame beams being pre-mounted through the adapter assembly and then welded.

By using the solution, the two adjacent frame beams are pre-mounted through the adapter assembly, so that the ends of the two adjacent frame beams are aligned and then welded, so as to avoid the situations of unstable weld formation and poor tangential force that may be withstood due to the difficulty in aligning the welding position. On the other hand, the inserting limiting assembly and the threaded connection assembly also have a connecting effect on the two adjacent frame beams, thereby further increasing the tangential force that the two adjacent frame beams may withstand after being connected, avoiding the situations that when the frame beams of the battery pack frame are only connected by welding, the battery pack frame is subjected to large tangential force at the connection position due to the excessive weight of the battery pack body, the weld is prone to cracking and failing, and safety hazards are caused, and meanwhile, improving the structural strength of the battery pack frame at the corner welding position, and improving the reliability and stability of the battery pack frame.

BRIEF DESCRIPTION OF THE DRAWINGS

The accompanying drawings of the specification, which constitute a part of the disclosure, are intended to provide a further understanding of the disclosure, and the exemplary embodiments of the disclosure and the description thereof are intended to explain the disclosure and do not constitute an undue limitation on the disclosure. In the drawings.

Figure 1:
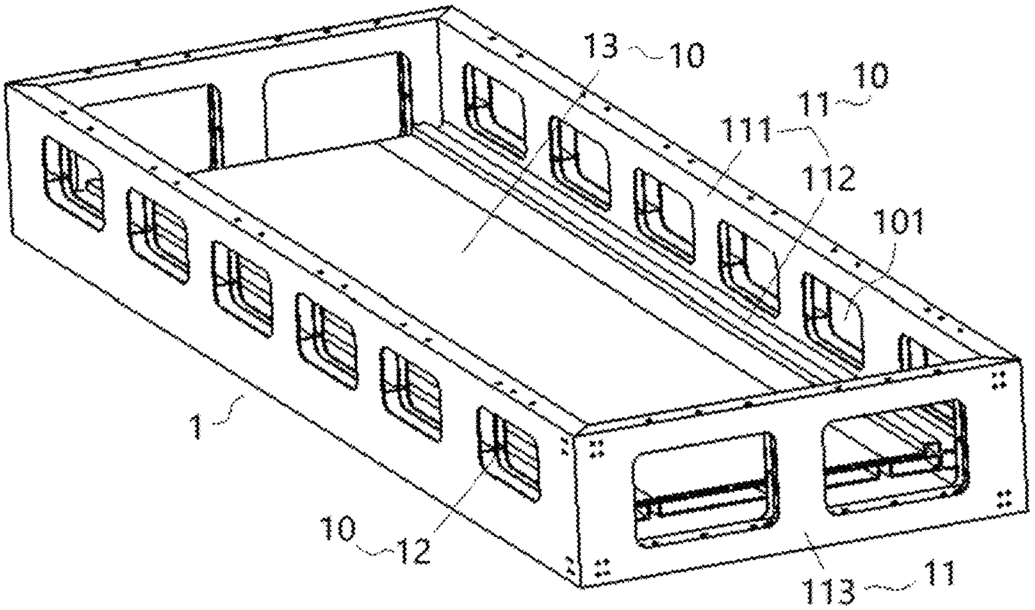
FIG. 1 shows a schematic structural diagram of a battery pack frame according to an embodiment of the disclosure.

Herein, the above drawings include the following reference signs.

1. Battery pack frame; 10. Frame body; 101. Weight-reducing mounting groove; 11. Frame beam; 111. Side beam; 112. Auxiliary support beam; 1121. Fixed beam; 1122. Second liquid-cooled beam; 113. End beam; 12. Reinforced beam set; 13. Main support beam; 131. First liquid-cooled beam; 132. Reinforced beam; 21. Threaded connection assembly; 211. Connecting lug; 22. Inserting limiting assembly; 221. Inserting protrusion; 222. Inserting groove; 2. Battery pack body; 3. Connecting assembly; 31. Bolt assembly; 311. Nut assembly; 3111. Lining beam; 3112. Connecting nut; 312. Connecting bolt; 32. Fastener.

DETAILED DESCRIPTION

The technical solutions in the embodiments of the disclosure will be clearly and completely described in conjunction with the drawings in the embodiments of the disclosure. It is apparent that the described embodiments are only a part of the embodiments of the disclosure, and not all of them. The following description of at least one exemplary embodiment is only illustrative, and in no way serves as any limitation on the disclosure or application or use thereof. All other embodiments obtained by those of ordinary skill in the art based on the embodiments of the disclosure without creative efforts are within the scope of protection of the disclosure.

As shown in FIG. 1 to FIG. 5, the embodiments of the disclosure provide a battery pack frame 1. The battery pack frame 1 includes a frame body 10 formed by connecting a plurality of frame beams 11 end to end. The battery pack frame 1 includes a plurality of adapter assemblies for pre-mounting two adjacent frame beams 11 of the plurality of frame beams 11. At least one adapter assembly of the plurality of adapter assemblies is arranged between any two adjacent frame beams 11, and each adapter assembly includes a threaded connection assembly 21 and an inserting limiting assembly 22, the inserting limiting assembly 22 being configured to limit relative positions of the two adjacent frame beams 11, the threaded connection assembly 21 being configured to pre-connect the two adjacent frame beams 11, and the two adjacent frame beams 11 being pre-mounted through the adapter assembly and then welded.

In the embodiment, the two adjacent frame beams 11 are pre-mounted through the adapter assembly, so that ends of the two adjacent frame beams 11 are aligned and then welded, so as to avoid the situations of unstable weld formation and poor tangential force that may be withstood due to the difficulty in aligning a welding position. On the other hand, the inserting limiting assembly 22 and the threaded connection assembly 21 also have a connecting effect on the two adjacent frame beams 11, thereby further increasing the tangential force that the two adjacent frame beams 11 may withstand after being connected, avoiding the situations that when the frame beams 11 of the battery pack frame 1 are only connected by welding, the battery pack frame 1 is subjected to large tangential force at a connection position due to the excessive weight of the battery pack body 2, the weld is prone to cracking and failing, and safety hazards are caused, and meanwhile, improving the structural strength of the battery pack frame 1 at a corner welding position, and improving the reliability and stability of the battery pack frame 1.

In an embodiment, the two adjacent frame beams 11 are riveted and then welded after being pre-mounted through the adapter assembly, so as to further improve the connection effect between the frame beams 11.

Figure 2:
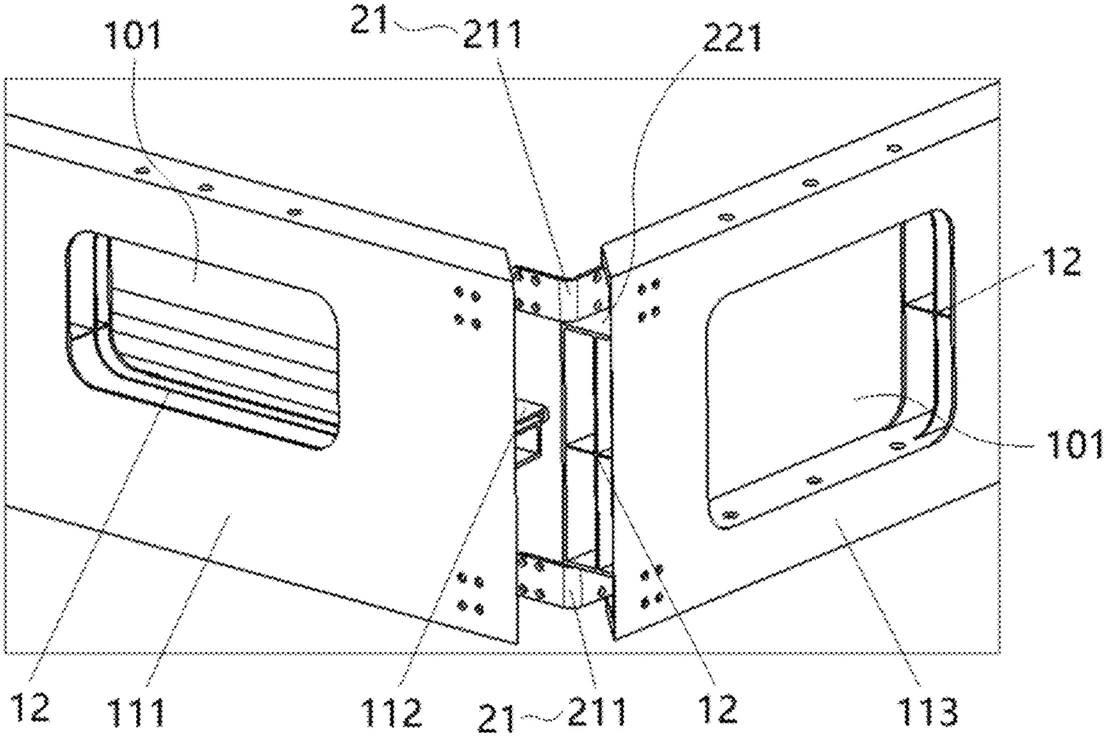
FIG. 2 shows a schematic structural diagram of a connection position of two frame beams in a battery pack frame in FIG. 1.
Figure 3:
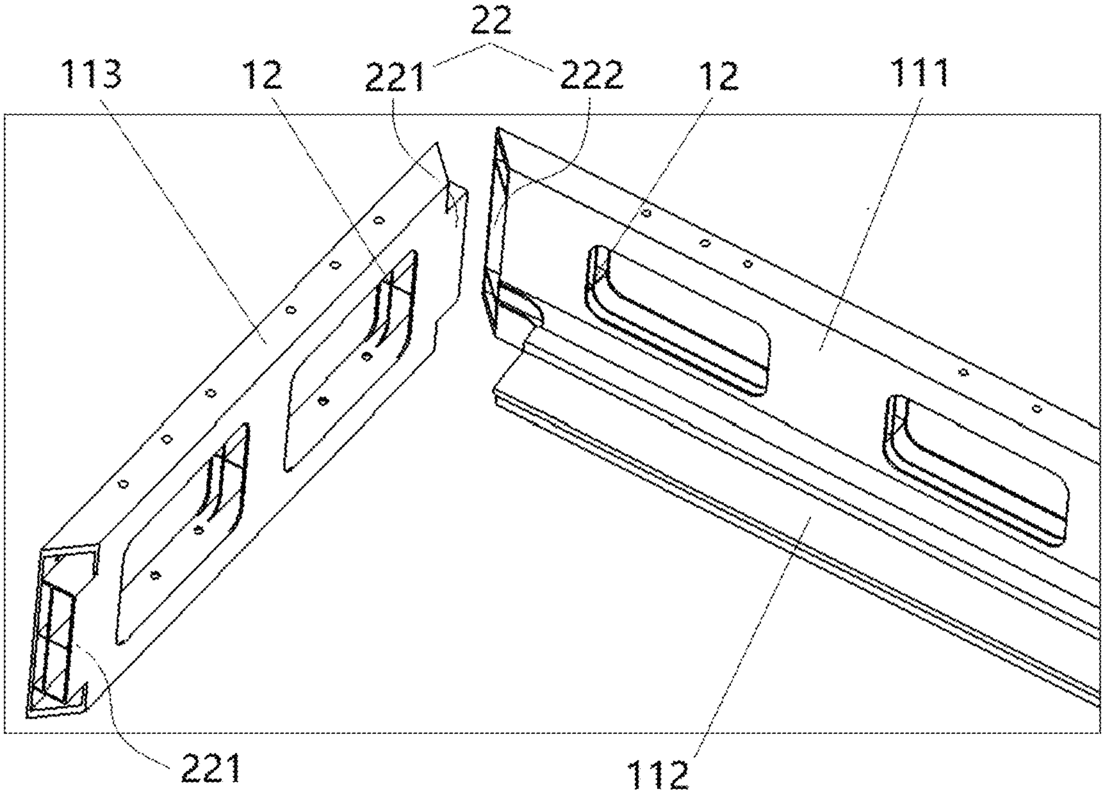
FIG. 3 shows a schematic structural diagram of a connection position of two frame beams in a battery pack frame in FIG. 2 from another perspective.

As shown in FIG. 2 and FIG. 3, each of the plurality of frame beams 11 is a hollow beam body with a rectangular cross section, the adapter assembly is arranged in a cavity of the frame beam 11 in a penetrating manner and is located at an end of the frame beam 11, a weld between the two adjacent frame beams 11 is a rectangular annular weld, and the rectangular annular weld is arranged around the adapter assembly. The arrangement is conducive to further improving the reliability and stability of the welding of the two adjacent frame beams 11. The each frame beam 11 of the battery pack frame 1 in the related art is usually an "I"-shaped beam or a "U"-shaped beam, and a weld formed at a corner connection position is a strip-shaped boundary raised special-shaped weld, which is difficult to weld and poor in sealing performance. In the embodiment, the structure of the frame beam 11 is adjusted, so that the welding area between the two adjacent frame beams 11 is larger and the formed weld is more stable. The ability of the special-shaped weld to withstand the tangential force is lower than the ability to withstand of the annular weld, thereby avoiding the problems of easiness in cracking and poor sealing performance of the strip-shaped special-shaped weld such as the "I"-shaped weld or the "U"-shaped weld in the related art, facilitating the welding of the two adjacent frame beams 11, and improving the structural strength of the frame beam 11 and the structural strength of the battery pack frame 1.

As shown in FIG. 2 and FIG. 3, a surface where an end opening of the frame beam 11 is located is inclined relative to a surface perpendicular to an extension direction of the frame beam 11. The inserting limiting assembly 22 includes an inserting protrusion 221 arranged in the cavity of the frame beam 11. An end of the inserting protrusion 221 protrudes from the end opening but does not protrude from the frame beam 11. An inserting groove 22 is formed in an end opening of another frame beam 11 of the two adjacent frame beams 11. The two adjacent frame beams 11 are matched with the inserting groove 222 by means of the inserting protrusion 221 in an inserted manner.

In the embodiment, the end opening of the frame beam 11 is limited, which is conducive to ensuring the complete butt welding of the two adjacent frame beams 11 and ensuring the welding strength. The extension of the end of the inserting protrusion 221 is limited to ensure that when the two adjacent frame beams 11 are butted, the inserting protrusion 221 may be inserted into the inserting groove 222 of the other frame beam 11 without interfering with the frame beam 11, thereby ensuring the reliability of the butt pre-mounting of the two adjacent frame beams 11.

In the embodiment, the frame beam 11 includes two oppositely arranged side beams 111 and two oppositely arranged end beams 113. The two side beams 111 and the two end beams 113 are alternately connected end to end. Both ends of the end beam 113 are provided with the inserting protrusions 221, and both ends of the side beam 111 are provided with the inserting grooves. Both ends of any one of the end beams 113 are respectively matched with two inserting grooves 222 on the same side of the two adjacent side beams 111 by means of the two inserting protrusions 221 in an inserted manner.

It is understandable that the arrangement of the inserting protrusion 221 and the inserting groove 222 is not limited to the embodiment. For example, in other embodiments not shown in the figures, one end of any one of the frame beams 11 is provided with the inserting protrusion 221 while the other end thereof is provided with the inserting groove 222, and the plurality of frame beams 11 are sequentially matched in an inserted manner.

Figure 4:
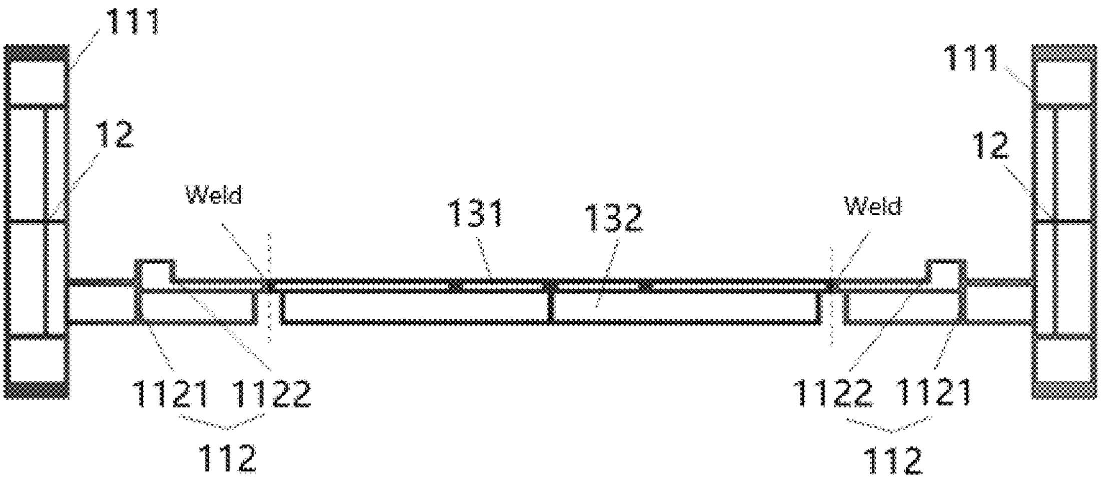
FIG. 4 shows a schematic diagram of a connection between a main support beam and a frame body of a battery pack frame in FIG. 1.

As shown in FIG. 2 to FIG. 4, a reinforced beam set 12 is arranged in the cavity of the frame beam 11, a part, protruding from the end opening, of the reinforced beam set 12 forms the inserting protrusion 221, and the inserting groove 222 is arranged at one end of the reinforced beam set 12 which does not protrude from the end opening. Through the arrangement, the structural strength of the frame beam 11 is improved by the reinforced beam set 12, thereby improving the structural strength of the battery pack frame 1.

As shown in FIG. 4, the reinforced beam set 12 is a spliced beam body with a cross section in a shape like Chinese character "wang", which includes three cross beams and one vertical beam, and may also be understood as including two cross beams and a strip beam with a "cross"-shaped cross section located between the two cross beams. For the end beam 113 with the inserting protrusions 221 at both ends, the extension length of the reinforced beam set 12 inside the end beam 113 is less than or equal to the maximum distance between the two end openings of the frame beam 11, and is greater than the minimum distance between the two end openings of the frame beam 11. In the embodiment, the extension length of the reinforced beam set 12 is equal to the maximum distance between the two end openings of the frame beam 11. For the side beam 111 with the inserting grooves 222 at both ends, the extension direction of the reinforced beam set 12 inside the side beam 111 is equal to the extension length of the frame beam 11, and an end surface of the reinforced beam set 12 is flush with the surface where the end opening of the frame beam 11 is located. An operator cuts the "cross"-shaped beam body in the middle of the end of the reinforced beam set 12, and the cut area between the upper and lower cross beams forms the inserting groove 222 for allowing the inserting protrusion 221 to be inserted. It is understandable that the reinforced beam set 12 and the frame beam 11 may be integrally machined, and the inserting protrusion 221 and the inserting groove 222 are machined and formed in the machining process.

In an embodiment, the reinforced beam set 12 and the frame beam 11 in the embodiment are integrally arranged.

In another embodiment, the shape of the reinforced beam set 12 is not limited to the embodiment, and may be other shapes that are prone to forming the inserting protrusion 221 and the inserting groove 222. No specific examples are given here.

In the embodiment, a plurality of threaded connection assemblies 21 are provided, the plurality of threaded connection assemblies 21 are distributed at intervals in an extension direction of the rectangular annular weld of the frame beam 11, and the threaded connection assembly 21 includes a connecting lug 211 and an adapter bolt, the connecting lug 211 including a first lug plate and a second lug plate connected to each other, and the first lug plate and the second lug plate being respectively in threaded connection with the two adjacent frame beams 11 through the adapter bolts.

In the embodiment, the two threaded connection assemblies 21 are arranged between the two adjacent frame beams 11, so as to further improve the reliability and stability of the mounting of the two adjacent frame beams 11. The first lug plate and the second lug plate are respectively fixed in the cavities of the two adjacent frame beams 11 through the adapter bolts, so as to connect the two adjacent frame beams 11. The arrangement further improves the tangential force that the two adjacent frame beams 11 may withstand after being connected, and improves the reliability and stability of the battery pack frame 1.

It is understandable that the number of threaded connection assemblies 21 between the two adjacent frame beams 11, the shape of the threaded connection assemblies 21, etc. may be adjusted according to actual conditions. Examples are not given here one by one.

Figure 5:
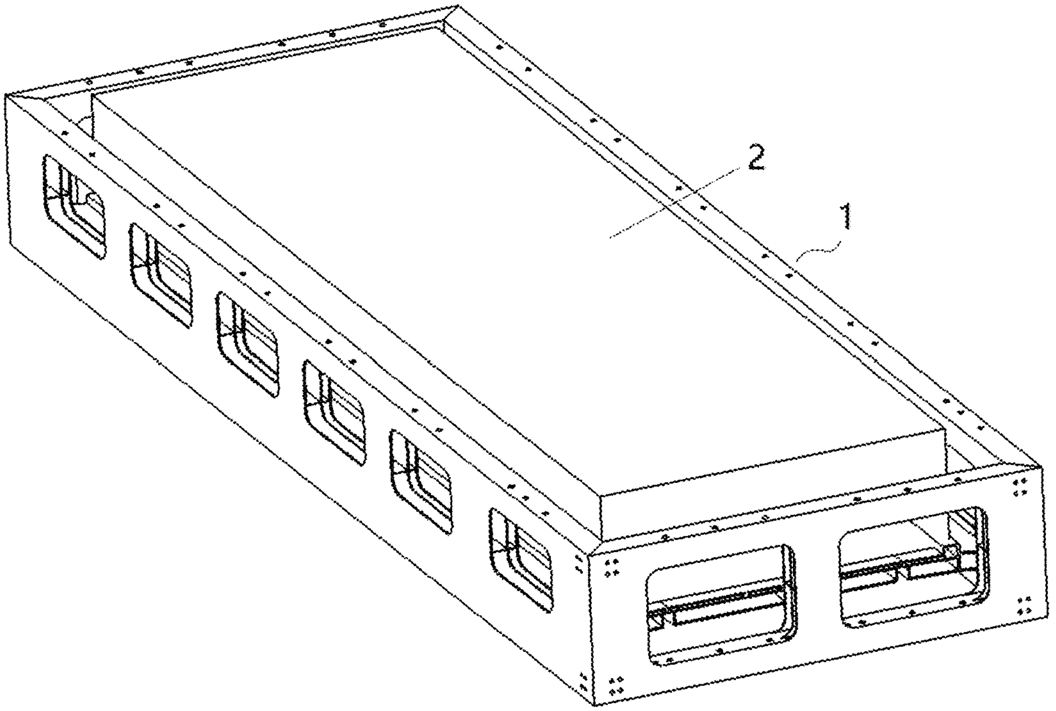
FIG. 5 shows a schematic diagram of application of a battery pack frame in FIG. 1.
Figure 6:
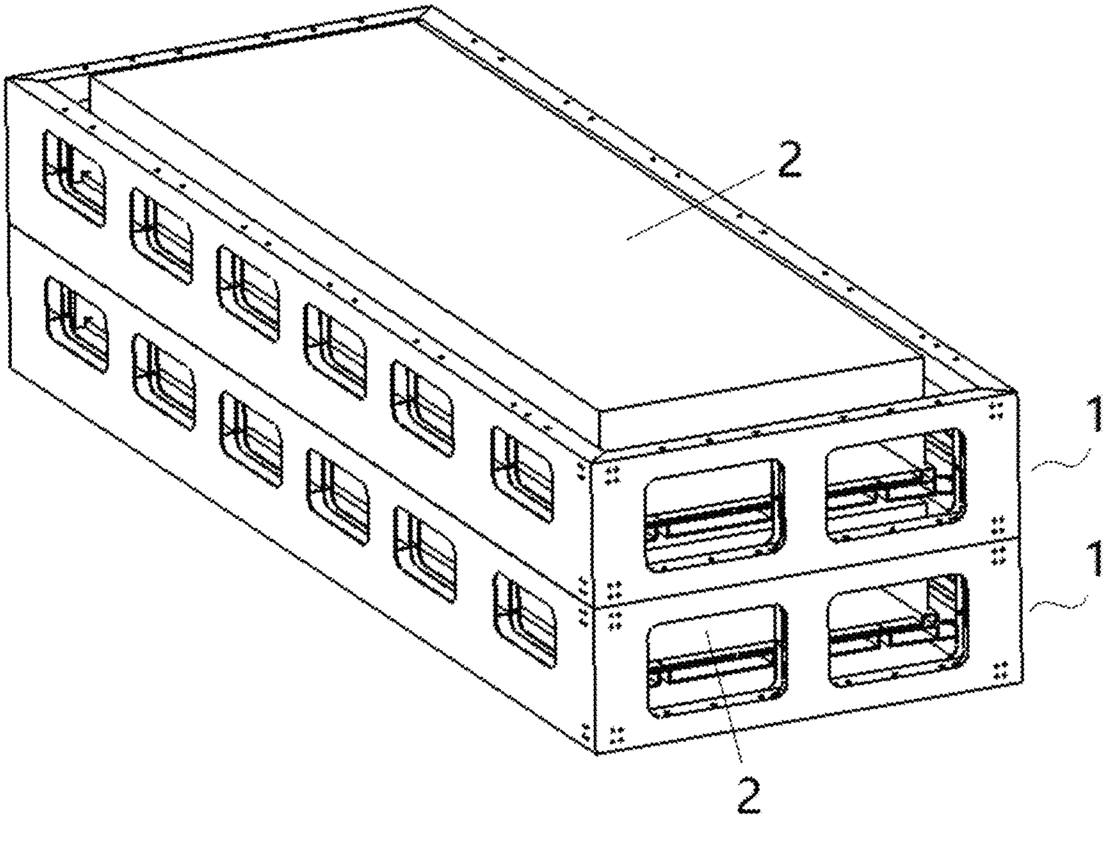
FIG. 6 shows a schematic structural diagram of a frame set according to another embodiment of the disclosure.

As shown in FIG. 1, FIG. 4, and FIG. 5, the frame beam 11 includes two oppositely arranged side beams 111. An auxiliary support beam 112 is integrally arranged at the bottom of the side beam 111, and the auxiliary support beams 112 at the bottoms of the two side beams 111 are oppositely arranged. The frame body 10 further includes a main support beam 13 arranged between the two auxiliary support beams 112 and connected to the two auxiliary support beams 112. The main support beam 13 and the two auxiliary support beams 112 are configured to jointly support the battery pack body 2, liquid-cooled channels are distributed on the main support beam 13 and the auxiliary support beams 112, and the liquid-cooled channels are configured to cool the battery pack body 2.

The arrangement facilitates support for the battery pack body 2 and is conducive to cooling the battery pack body 2 to ensure the reliability of operation of the battery pack. It is to be noted that the liquid-cooled channel is configured to provide circulating cold flow for the battery pack body 2 to achieve cooling of the battery pack body 2. The height of the liquid-cooled channel is usually 8-10 mm.

It is to be noted that the threaded connection assembly 21 and the inserting limiting assembly in the embodiment are both steel structures, and the plurality of beams of the frame body 10 and the main support beam 13 are all integrally extruded aluminum alloy profiles.

In an embodiment, the main support beam 13 includes a first liquid-cooled beam 131 and a reinforced beam 132 stacked up and down and arranged integrally. The auxiliary support beam 112 includes a fixed beam 1121 and a second liquid-cooled beam 1122 integrally arranged above the fixed beam 1121. The liquid-cooled channels are formed in regions in the first liquid-cooled beam 131 and the second liquid-cooled beam 1122, the reinforced beam 132 is spaced from the fixed beams 1121 on both sides, and the first liquid-cooled beam 131 and the second liquid-cooled beams 1122 on both sides are subjected to double-sided friction stir welding.

In the embodiment, the liquid-cooled beams (including the first liquid-cooled beam 131 and the second liquid-cooled beam 1122) and the support beams (including the main support beam 13 and the auxiliary support beam 112) are divided into regions and the two parts in each region are integrally arranged, and then the first liquid-cooled beam 131 and the second liquid-cooled beams 1122 on both sides are fixedly connected by double-sided stir friction welding, thereby avoiding the situation in the related art that the first liquid-cooled beam 131 and the second liquid-cooled beam 1122 need to be arranged on the support beam through the plurality of bolts, and the mounting efficiency is low, and avoiding the problem that when the first liquid-cooled beam 131 and the second liquid-cooled beam 1122 are arranged on the support beam through a plurality of bolt pieces, the plurality of bolt pieces are easily subjected to the pressure of the battery pack body 2 and the bolts are loosened or broken in batches. Further, the fixed beam 1121 and the second liquid-cooled beam 1122 are integrally arranged, and the fixed beam 1121 and the side beam 111 are integrally arranged, which is conducive to ensuring the machining and structural strength of the frame beam 11. The arrangement of the reinforced beam 132 is conductive to increasing the structural strength of the main support beam 13 and ensuring the stability and reliability of the frame body 10. It is understandable that other connection methods (such as other types of welding, etc.) that may achieve one-time machining connection may also be used between the main support beam 13 and the two auxiliary support beams 112. Examples are not given here one by one.

In the related art, in order to ensure the power demand for long-distance transportation, the cruising range is generally increased by increasing the number of battery packs, and the plurality of battery pack frames 1 are stacked and placed at the rear of a cab. As shown in FIG. 6 to FIG. 9, another embodiment of the disclosure provides a frame set. The frame set includes a connecting assembly 3 and a plurality of above battery pack frames 1. The plurality of battery pack frames 1 are sequentially stacked in a height direction of the frame set, any two adjacent battery pack frames 1 are connected through the connecting assembly 3, and a battery pack body 2 is correspondingly arranged in any one of the plurality of battery pack frames 1.

In the embodiment, the two adjacent frame beams 11 are pre-mounted through the adapter assembly, so that ends of the two adjacent frame beams 11 are aligned and then welded, so as to avoid the situation that the overall center of gravity of the assembly of the battery pack body 2 is too high, which may easily cause the battery pack frame 1 to crack and fail at the corner connection position, and the corner sealing performance is insufficient, causing greater safety hazards. On the other hand, the inserting limiting assembly 22 and the threaded connection assembly 21 also have a connecting effect on the two adjacent frame beams 11, which further increases the tangential force that the two adjacent frame beams 11 may withstand after being connected, improves the structural strength of any one of the plurality of battery pack frames 1 in the frame set at the corner welding position, and improves the reliability and stability of the frame set.

Figure 7:
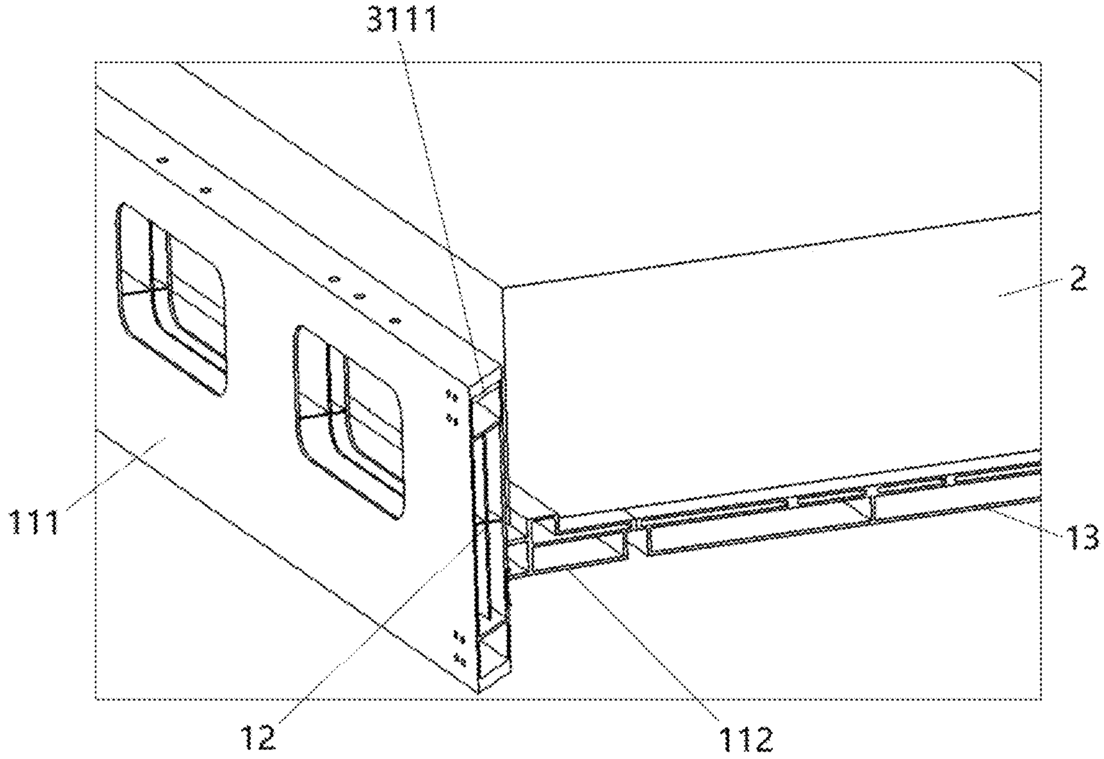
FIG. 7 shows a schematic diagram of a mounting position of a nut assembly in a frame set in FIG. 6.
Figure 8:
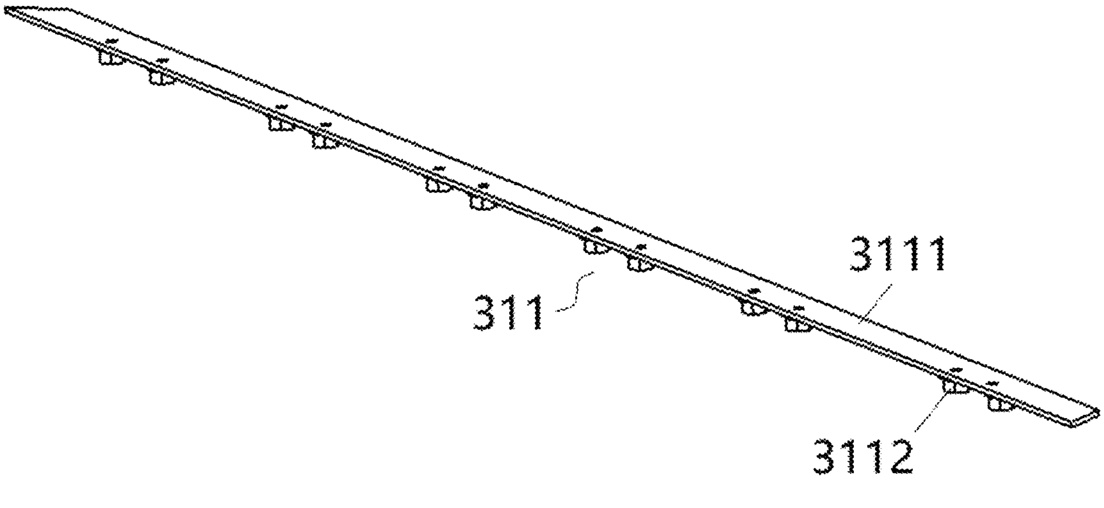
FIG. 8 shows a schematic structural diagram of a nut assembly in a frame set in FIG. 6.
Figure 9:
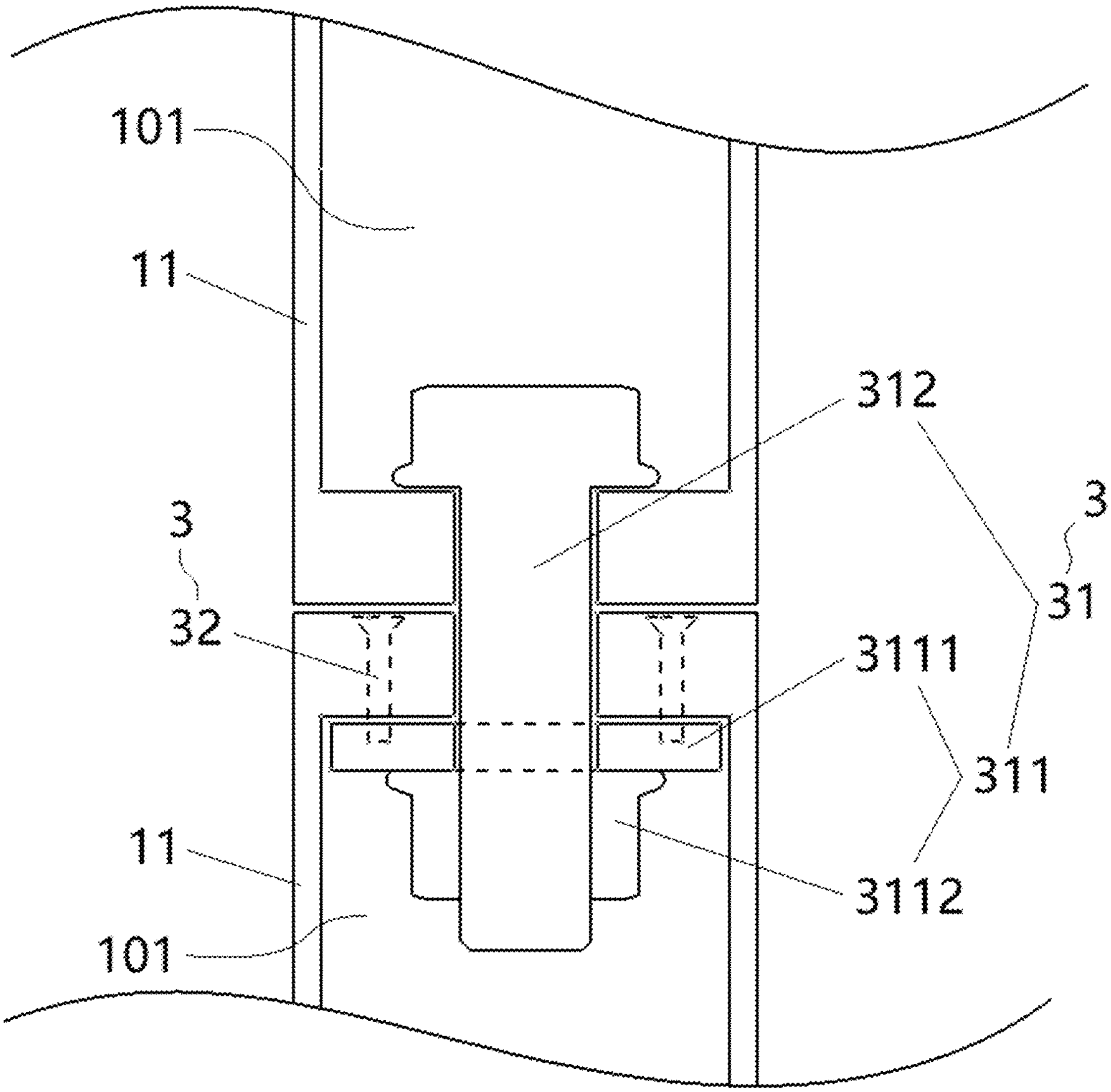
FIG. 9 shows a schematic diagram of a connection between two adjacent battery pack frames in a frame set in FIG. 6.

As shown in FIG. 7 to FIG. 9, the connecting assembly 3 includes a plurality of bolt assemblies 31. The two corresponding frame beams 11 of any two adjacent battery pack frames 1 are connected through one bolt assembly 31. The bolt assembly 31 includes a nut assembly 311 and a connecting bolt 312. The nut assembly 311 includes a lining beam 3111 and a plurality of connecting nuts 3112 welded to the lining beam 3111. The nut assembly 311 is arranged in one frame beam 11 of one of the plurality of battery pack frames 1. One end of the connecting bolt 312 penetrates into the adjacent frame beam 11 from the inside of the other frame beam 11 and is in threaded connection with the corresponding connecting nut 3112. Through the arrangement, the lining beam 3111 and the plurality of connecting nuts 3112 are welded into a whole, and are embedded in the each frame beam 11 as a whole for mounting, and then the operator mounts the plurality of connecting bolts 312 one by one, thereby avoiding the situations that the plurality of connecting nuts 3112 and the plurality of connecting bolts 312 need to be mounted one by one in the related art, which leads to low assembly efficiency and difficulty in maintenance and disassembly, and improving the mounting efficiency of the two adjacent battery pack frames 1. The connecting assembly 3 further includes a fastener 32, and the lining beam 3111 is fixedly embedded in the each frame beam 11 through the fastener 32. The fastener 32 may be a connecting piece such as a cone head bolt.

In the present embodiment, the frame beam 11 of the battery pack frame 1 is provided with a weight-saving mounting groove 101, and the connecting bolt 312 is mounted into a cavity of the frame beam 11 from the weight-saving mounting groove 101. In the embodiment, the position of the frame beam 11 corresponding to any one of the connecting nuts 3112 is provided with the weight-reducing mounting groove 101. The arrangement facilitates the mounting of the bolt assembly 31 by the operator on the basis of reducing the weight of the frame set.

Still another embodiment of the disclosure provides a new energy heavy truck. The new energy heavy truck includes a plurality of battery pack bodies 2 and the above frame set. The plurality of battery pack bodies 2 are correspondingly arranged in a plurality of battery pack frames 1 of the frame set.

The above is only the preferred embodiments of the disclosure, and is not intended to limit the disclosure, and for those of ordinary skill in the art, various modifications and changes may be made to the disclosure. Any modifications, equivalent substitutions, improvements, etc. within the spirit and scope of the disclosure shall be included in the scope of protection of the disclosure.

The invention claimed is:

1. A battery pack frame comprising a frame body formed by connecting a plurality of frame beams end to end, wherein the battery pack frame comprises a plurality of adapter assemblies for pre-mounting two adjacent frame beams of the plurality of frame beams;

at least one adapter assembly of the plurality of adapter assemblies is arranged between any of the two adjacent frame beams;

each adapter assembly of the plurality of adapter assemblies comprises a threaded connection assembly and an inserting limiting assembly;

the inserting limiting assembly is configured to limit relative positions of the two adjacent frame beams;

the threaded connection assembly is configured to pre-connect the two adjacent frame beams;

the two adjacent frame beams are pre-mounted through the each adapter assembly and then welded, each frame beam of the plurality of frame beams is a hollow beam body with a rectangular cross section, the at least one adapter assembly is arranged in a cavity of the each frame beam in a penetrating manner and is located at an end of the each frame beam, a weld between the two adjacent frame beams is a rectangular annular weld, and the rectangular annular weld is arranged around the at least one adapter assembly, a surface where an end opening of the each frame beam is located is inclined relative to a surface perpendicular to an extension direction of the each frame beam;

the inserting limiting assembly comprises an inserting protrusion arranged in the cavity of the each frame beam, wherein an end of the inserting protrusion protrudes from the end opening but does not protrudes from the each frame beam;

an inserting groove is formed in an end opening of another frame beam of the two adjacent frame beams;

the two adjacent frame beams are matched with the inserting groove by means of the inserting protrusion in an inserted manner, a reinforced beam set is arranged in the cavity of the each frame beam, a part, protruding from the end opening, of the reinforced beam set forms the inserting protrusion, and the inserting groove is arranged at one end of the reinforced beam set which does not protrude from the end opening, the each frame beam comprises two oppositely arranged side beams, wherein an auxiliary support beam is integrally arranged at a bottom of each of the side beams, and two auxiliary support beams at bottoms of the two oppositely arranged side beams are oppositely arranged; and the frame body further comprises a main support beam arranged between the two auxiliary support beams and connected to the two auxiliary support beams, wherein the main support beam and the two auxiliary support beams are configured to jointly support the battery pack body, liquid-cooled channels are distributed on the main support beam and the auxiliary support beam, and the liquid-cooled channels are configured to cool the battery pack body.

2. The battery pack frame as claimed in claim 1, wherein a plurality of threaded connection assemblies are provided, the plurality of threaded connection assemblies are distributed at intervals in an extension direction of the rectangular annular weld of the each frame beam, and the threaded connection assembly comprises a connecting lug and an adapter bolt, the connecting lug comprising a first lug plate and a second lug plate connected to each other, and the first lug plate and the second lug plate being respectively in threaded connection with the two adjacent frame beams through adapter bolts of the plurality of threaded connection assemblies.

3. The battery pack frame as claimed in claim 1, wherein the main support beam comprises a first liquid-cooled beam and a reinforced beam stacked up and down and arranged integrally; the auxiliary support beam comprises a fixed beam and a second liquid-cooled beam integrally arranged above the fixed beam; at least one liquid-cooled channel of the liquid-cooled channels is formed in cavities of the first liquid-cooled beam and the second liquid-cooled beam, the reinforced beam is spaced from fixed beams on both sides of the reinforced beam, and the first liquid-cooled beam and second liquid-cooled beams on both sides of the first liquid-cooled beam are subjected to double-sided friction stir welding.

4. The battery pack frame as claimed in claim 3, wherein the fixed beam and the second liquid-cooled beam are integrally arranged.

5. The battery pack frame as claimed in claim 3, wherein the fixed beam and the side beam are integrally arranged.

6. The battery pack frame as claimed in claim 1, wherein the two adjacent frame beams are riveted and then welded after being pre-mounted through the adapter assembly.

7. A frame set, comprising a connecting assembly and a plurality of battery pack frames as claimed in claim 1, wherein the plurality of battery pack frames are sequentially stacked in a height direction of the frame set, any two adjacent battery pack frames of the plurality of battery pack frames are connected through the connecting assembly, and a battery pack body is correspondingly arranged in any one of the plurality of battery pack frames.

8. The frame set as claimed in claim 7, wherein the connecting assembly comprises a plurality of bolt assemblies, wherein two corresponding frame beams of the any two adjacent battery pack frames are connected through one bolt assembly of the plurality of bolt assemblies; each of the bolt assemblies comprises a nut assembly and a connecting bolt; the nut assembly comprises a lining beam and a plurality of connecting nuts welded to the lining beam; the nut assembly is arranged in one frame beam of one of the plurality of battery pack frames; and one end of the connecting bolt penetrates into an adjacent frame beam from an inside of another frame beam and is in threaded connection with corresponding connecting nut of the plurality of connecting nuts.

9. The frame set as claimed in claim 8, wherein the each frame beam of the battery pack frame is provided with a weight-saving mounting groove, and the connecting bolt is mounted into a cavity of the each frame beam from the weight-saving mounting groove.

10. The frame set as claimed in claim 7, wherein a plurality of threaded connection assemblies are provided, the plurality of threaded connection assemblies are distributed at intervals in an extension direction of the rectangular annular weld of the each frame beam, and the threaded connection assembly comprises a connecting lug and an adapter bolt, the connecting lug comprising a first lug plate and a second lug plate connected to each other, and the first lug plate and the second lug plate being respectively in threaded connection with the two adjacent frame beams through adapter bolts of the plurality of threaded connection assemblies.

11. The frame set as claimed in claim 7, wherein the main support beam comprises a first liquid-cooled beam and a reinforced beam stacked up and down and arranged integrally; the auxiliary support beam comprises a fixed beam and a second liquid-cooled beam integrally arranged above the fixed beam; at least one liquid-cooled channel of the liquid-cooled channels is formed in cavities of the first liquid-cooled beam and the second liquid-cooled beam, the reinforced beam is spaced from fixed beams on both sides of the reinforced beam, and the first liquid-cooled beam and second liquid-cooled beams on both sides of the first liquid-cooled beam are subjected to double-sided friction stir welding.

12. The frame set as claimed in claim 11, wherein the fixed beam and the second liquid-cooled beam are integrally arranged.

13. The frame set as claimed in claim 11, wherein the fixed beam and the side beam are integrally arranged.

14. The frame set as claimed in claim 7, wherein the two adjacent frame beams are riveted and then welded after being pre-mounted through the adapter assembly.

15. A new energy heavy truck, comprising a plurality of battery pack bodies and the frame set as claimed in claim 7, wherein the plurality of battery pack bodies are correspondingly arranged in the plurality of battery pack frames of the frame set.

16. The new energy heavy truck as claimed in claim 15, wherein the connecting assembly comprises a plurality of bolt assemblies, wherein two corresponding frame beams of the any two adjacent battery pack frames are connected through one bolt assembly of the plurality of bolt assemblies; each of the bolt assemblies comprises a nut assembly and a connecting bolt; the nut assembly comprises a lining beam and a plurality of connecting nuts welded to the lining beam; the nut assembly is arranged in one frame beam of one of the plurality of battery pack frames; and one end of the connecting bolt penetrates into an adjacent frame beam from an inside of another frame beam and is in threaded connection with corresponding connecting nut of the plurality of connecting nuts.

17. The new energy heavy truck as claimed in claim 16, wherein the each frame beam of the battery pack frame is provided with a weight-saving mounting groove, and the connecting bolt is mounted into a cavity of the each frame beam from the weight-saving mounting groove.

18. The new energy heavy truck as claimed in claim 15, wherein a plurality of threaded connection assemblies are provided, the plurality of threaded connection assemblies are distributed at intervals in an extension direction of the rectangular annular weld of the each frame beam, and the threaded connection assembly comprises a connecting lug and an adapter bolt, the connecting lug comprising a first lug plate and a second lug plate connected to each other, and the first lug plate and the second lug plate being respectively in threaded connection with the two adjacent frame beams through adapter bolts of the plurality of threaded connection assemblies.

19. The new energy heavy truck as claimed in claim 15, wherein the main support beam comprises a first liquid-cooled beam and a reinforced beam stacked up and down and arranged integrally; the auxiliary support beam comprises a fixed beam and a second liquid-cooled beam integrally arranged above the fixed beam; at least one liquid-cooled channel of the liquid-cooled channels is formed in cavities of the first liquid-cooled beam and the second liquid-cooled beam, the reinforced beam is spaced from fixed beams on both sides of the reinforced beam, and the first liquid-cooled beam and second liquid-cooled beams on both sides of the first liquid-cooled beam are subjected to double-sided friction stir welding.

20. The frame set as claimed in claim 19, wherein the fixed beam and the second liquid-cooled beam are integrally arranged.

* * * * *